US008634106B2

(12) United States Patent
Miyamoto

(10) Patent No.: US 8,634,106 B2
(45) Date of Patent: Jan. 21, 2014

(54) IMAGE PROCESSING DEVICE

(75) Inventor: Yusuke Miyamoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 112 days.

(21) Appl. No.: 13/432,409

(22) Filed: Mar. 28, 2012

(65) Prior Publication Data

US 2013/0050721 A1  Feb. 28, 2013

(30) Foreign Application Priority Data

Aug. 31, 2011  (JP) .................. 2011-189186

(51) Int. Cl.
| H04N 1/60 | (2006.01) |
| H04N 1/46 | (2006.01) |
| G06K 15/00 | (2006.01) |
| G06K 9/00 | (2006.01) |
| G03F 3/08 | (2006.01) |

(52) U.S. Cl.
USPC ............ 358/1.9; 358/2.1; 358/3.24; 358/518; 358/513; 382/165

(58) Field of Classification Search
USPC ............ 358/1.9, 2.1, 3.24, 518, 513; 382/165
See application file for complete search history.

(56) References Cited

U.S. PATENT DOCUMENTS

| 5,287,204 A | 2/1994 | Koizumi et al. |
| 8,194,284 B2 * | 6/2012 | Cho .............................. 358/2.1 |
| 2009/0225378 A1 * | 9/2009 | Minamino .................... 358/513 |

FOREIGN PATENT DOCUMENTS

| JP | H04-336876 A | 11/1992 |
| JP | 2003-116011 A | 4/2003 |
| JP | 2004-274397 A | 9/2004 |

* cited by examiner

*Primary Examiner* — Charlotte M Baker
(74) *Attorney, Agent, or Firm* — Scully, Scott, Murphy & Presser, PC

(57) ABSTRACT

Read data indicative of first and second surfaces of manuscript is divided into a plurality of first and second blocks, respectively. A judging unit judges, based on a first condition, whether each second block is a specified second block and whether each first block is a specified first block. A second condition is set for each first block corresponding to the specified second block. Each second block is more difficult to be judged as the specified second block based on respective second condition than based on the first condition. The judging unit judges whether each first block corresponding to the specified second block is the specified first block based on the respective second condition. The first surface is a specified color first surface when a ratio of a number of the specified first blocks to a total number of first blocks is greater than or equal to a prescribed value.

13 Claims, 6 Drawing Sheets

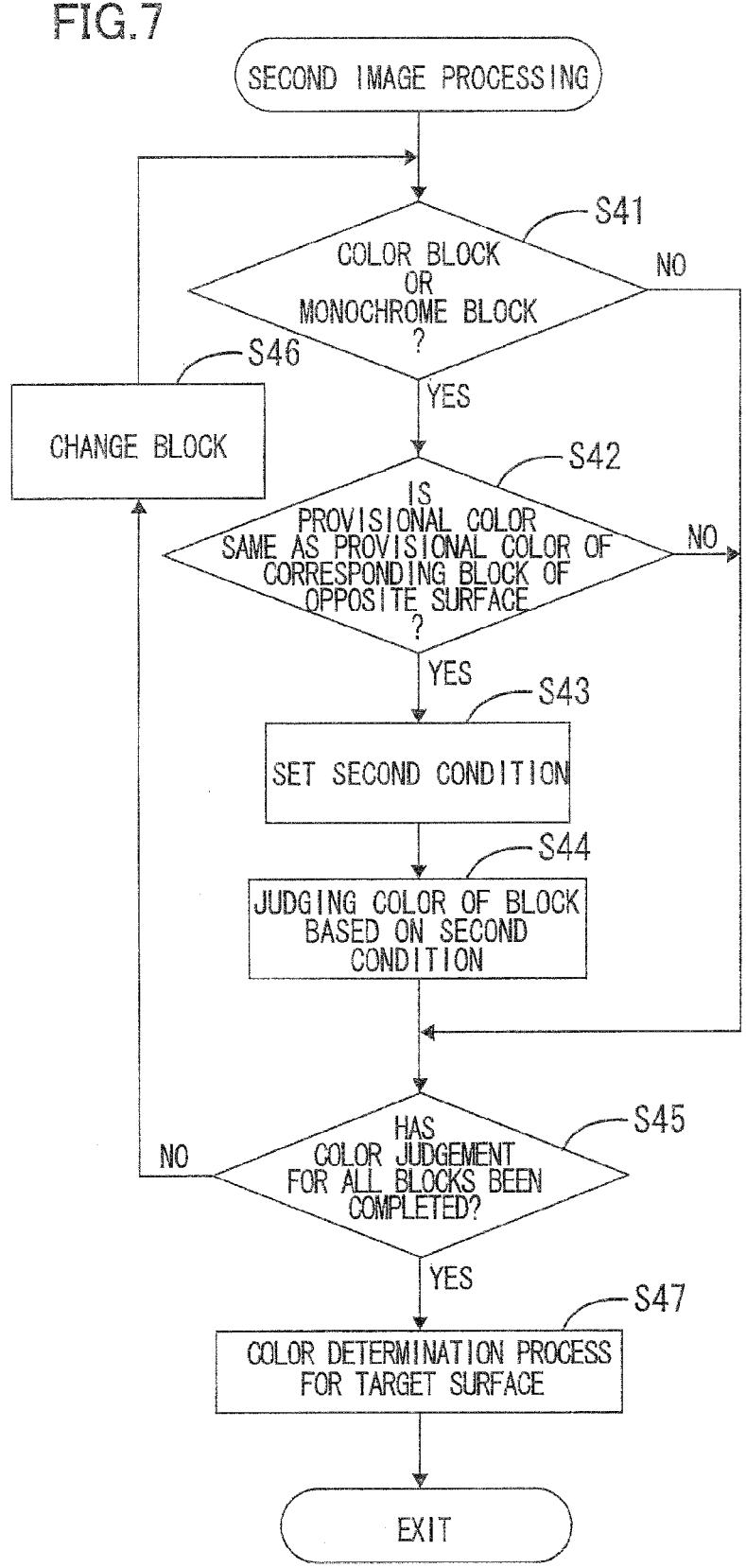

IMAGE PROCESSING DEVICE

CROSS REFERENCE TO RELATED APPLICATION

This application claims priority from Japanese Patent Application No. 2011-189186 filed Aug. 31, 2011. The entire content of the priority application is incorporated herein by reference.

TECHNICAL FIELD

The present invention relates to an image processing device.

BACKGROUND

There is conventionally known an image processing apparatus that performs a so-called color determination for determining whether a manuscript is a color manuscript or monochrome manuscript. For example, this apparatus determines an expression color expressing an image on a manuscript to determine whether a manuscript type is a color manuscript or a black-and-white manuscript based on image data of the manuscript read by an image reading means such as a CIS (Contact Image Sensor). The color manuscript means that the manuscript is expressed in color and refers to, e.g., a manuscript in which the ratio of a chromatic color area relative to the entire image is higher than or equal to a predetermined threshold. The monochrome manuscript means that the manuscript is expressed in monochrome and refers to, e.g., a manuscript, such as black-and-white manuscript or grayscale manuscript, in which the ratio of the chromatic color area relative to the entire image is lower than a predetermined threshold and the ratio of an achromatic color area relative to the entire image is higher than or equal to a predetermined threshold.

SUMMARY

In the case where one surface of a single sheet of a manuscript is read, a so-called show-through may occur, where an image reading means reads not only an image on the one surface but also an image on the other surface that is visible on the one surface by irradiated light from a light source included in the image read means. Assume that an image processing apparatus reads a first surface of a manuscript on which a black-and-white image is printed and a second surface thereof on which a color image is printed and performs color determination based on the read results. In this case, the color image on the second surface may be visible on the first surface side, which may cause the image processing apparatus that should normally determine that the image on the first surface is the black-and-white image to make erroneous determination of the expression color of the image on the manuscript, that is, to determine that the image on the first surface is the color image.

In view of the foregoing, it is an object of the invention to provide an image processing device capable of suppressing an occurrence of erroneous determination of the expression color type of an image on a manuscript which is caused due to show-through.

In order to attain the above and other objects, the invention provides an image processing device including an acquiring unit and a processor. The acquiring unit is configured to acquire first read data indicative of an image formed on a first surface of a single sheet of manuscript and configured to acquire second read data indicative of an image formed on a second surface of the single sheet of the manuscript. The processor is configured to function as a dividing unit, a first judging unit, a second judging unit, a setting unit, a third judging unit, a calculating unit, and a determining unit. The dividing unit is configured to divide the first read data into a plurality of first blocks and to divide the second read data into a plurality of second blocks, each of the plurality of second blocks corresponding to respective ones of the plurality of first blocks. The first surface includes a plurality of first regions each corresponding to respective ones of the plurality of first blocks. The second surface includes a plurality of second regions each corresponding to respective ones of the plurality of second blocks. A first region to which each of the plurality of first blocks corresponds is opposite a second region to which respective ones of the second block corresponds. The first judging unit is configured to judge whether or not each second block is a specified color second block based on a first determination condition. The specified color second block corresponds to a second region that is expressed by a first specified color. The first judging unit judges that a second block is the specified color second block if the second block satisfies the first determination condition. The first judging unit judges that a second block is not the specified color second block if the second block does not satisfy the first determination condition. The second judging unit is configured to judge whether or not each first block corresponding to a second block judged not to be the specified color second block is a specified color first block based on the first determination condition. The specified color first block corresponds to a first region expressed by a second specified color. The second judging unit judges that a first block is the specified color first block if the first block satisfies the first determination condition. The second judging unit judges that a first block is not the specified color first block if the first block does not satisfy the first determination condition. The setting unit is configured to set a second determination condition for each first block corresponding to a second block judged to be the specified color second block by the first judging unit. Each second block is more difficult to be judged as the specific color second block based on the respective second determination condition than based on the first determination condition. The third judging unit is configured to judge whether or not each first block corresponding to a second block judged to be the specified color second block by the first judging unit is the specified color first block based on the respective second determination condition. The third judging unit judges that a first block is the specified color first block if the first block satisfies the second determination condition. The third judging unit judges that a first block is not the specified color first block if the first block does not satisfy the second determination condition. The calculating unit is configured to calculate a first ratio of a total number of the specified color first block judged by the second judging unit and the third judging unit to a total number of the plurality of first blocks. The determining unit is configured to determine that the first surface is a specified color first surface when the first ratio is greater than or equal to a prescribed value. An image formed on the specified color first surface has a second ratio higher than a predetermined value. The second ratio is a ratio of an area expressed by the second specified color relative to the entire of the image formed on the specified color first surface.

According to another aspect, the present invention provides an image processing method including: acquiring first read data indicative of an image formed on a first surface of a single sheet of manuscript and acquiring second read data indicative of an image formed on a second surface of the single sheet of the manuscript; dividing, by a processor, the first read data into a plurality of first blocks and dividing the second read data into a plurality of second blocks, each of the plurality of second blocks corresponding to respective ones of the plurality of first blocks, the first surface including a plurality of first regions each corresponding to respective ones of the plurality of first blocks, the second surface including a plurality of second regions each corresponding to respective ones of the plurality of second blocks, a first region to which each of the plurality of first blocks corresponds being opposite a second region to which respective ones of the second block corresponds; (a) judging whether or not each second block is a specified color second block based on a first determination condition, the specified color second block corresponding to a second region that is expressed by a first specified color, a second block being judged to be the specified color second block if the second block satisfies the first determination condition, a second block being judged not to be the specified color second block if the second block does not satisfy the first determination condition; (b) judging whether or not each first block corresponding to a second block judged not to be the specified color second block is a specified color first block based on the first determination condition, the specified color first block corresponding to a first region expressed by a second specified color, a first block being judged to be the specified color first block if the first block satisfies the first determination condition, a first block being judged not to be the specified color first block if the first block does not satisfy the first determination condition; setting a second determination condition for each first block corresponding to a second block judged to be the specified color second block in the (a) judging, each second block being more difficult to be judged as the specific color second block based on the respective second determination condition than based on the first determination condition; (c) judging whether or not each first block corresponding to a second block judged to be the specified color second block in the (a) judging is the specified color first block based on the respective second determination condition, a first block being judged to be the specified color first block if the first block satisfies the second determination condition, a first block being judged not to be the specified color first block if the first block does not satisfy the second determination condition; calculating a first ratio of a total number of the specified color first block judged in the (b) judging and the (c) judging to a total number of the plurality of first blocks; and determining that the first surface is a specified color first surface when the first ratio is greater than or equal to a prescribed value, an image formed on the specified color first surface having a second ratio higher than a predetermined value, the second ratio being a ratio of an area expressed by the second specified color relative to the entire of the image formed on the specified color first surface.

According to another aspect, the present invention provides a non-transitory computer readable storage medium storing a set of program instructions installed on and executed by a computer. The program instructions includes: acquiring first read data indicative of an image formed on a first surface of a single sheet of manuscript and acquiring second read data indicative of an image formed on a second surface of the single sheet of the manuscript; dividing the first read data into a plurality of first blocks and dividing the second read data into a plurality of second blocks, each of the plurality of second blocks corresponding to respective ones of the plurality of first blocks, the first surface including a plurality of first regions each corresponding to respective ones of the plurality of first blocks, the second surface including a plurality of second regions each corresponding to respective ones of the plurality of second blocks, a first region to which each of the plurality of first blocks corresponds being opposite a second region to which respective ones of the second block corresponds; (a) judging whether or not each second block is a specified color second block based on a first determination condition, the specified color second block corresponding to a second region that is expressed by a first specified color, a second block being judged to be the specified color second block if the second block satisfies the first determination condition, a second block being judged not to be the specified color second block if the second block does not satisfy the first determination condition; (b) judging whether or not each first block corresponding to a second block judged not to be the specified color second block is a specified color first block based on the first determination condition, the specified color first block corresponding to a first region expressed by a second specified color, a first block being judged to be the specified color first block if the first block satisfies the first determination condition, a first block being judged not to be the specified color first block if the first block does not satisfy the first determination condition; setting a second determination condition for each first block corresponding to a second block judged to be the specified color second block in the (a) judging, each second block being more difficult to be judged as the specific color second block based on the respective second determination condition than based on the first determination condition; (c) judging whether or not each first block corresponding to a second block judged to be the specified color second block in the (a) judging is the specified color first block based on the respective second determination condition, a first block being judged to be the specified color first block if the first block satisfies the second determination condition, a first block being judged not to be the specified color first block if the first block does not satisfy the second determination condition; calculating a first ratio of a total number of the specified color first block judged in the (b) judging and the (c) judging to a total number of the plurality of first blocks; and determining that the first surface is a specified color first surface when the first ratio is greater than or equal to a prescribed value, an image formed on the specified color first surface having a second ratio higher than a predetermined value, the second ratio being a ratio of an area expressed by the second specified color relative to the entire of the image formed on the specified color first surface.

BRIEF DESCRIPTION OF THE DRAWINGS

The particular features and advantages of the invention as well as other objects will become apparent from the following description taken in connection with the accompanying drawings, in which:

FIG. 7 is a flowchart illustrating steps in a second image processing in the reading process.

DETAILED DESCRIPTION

Figure 1:
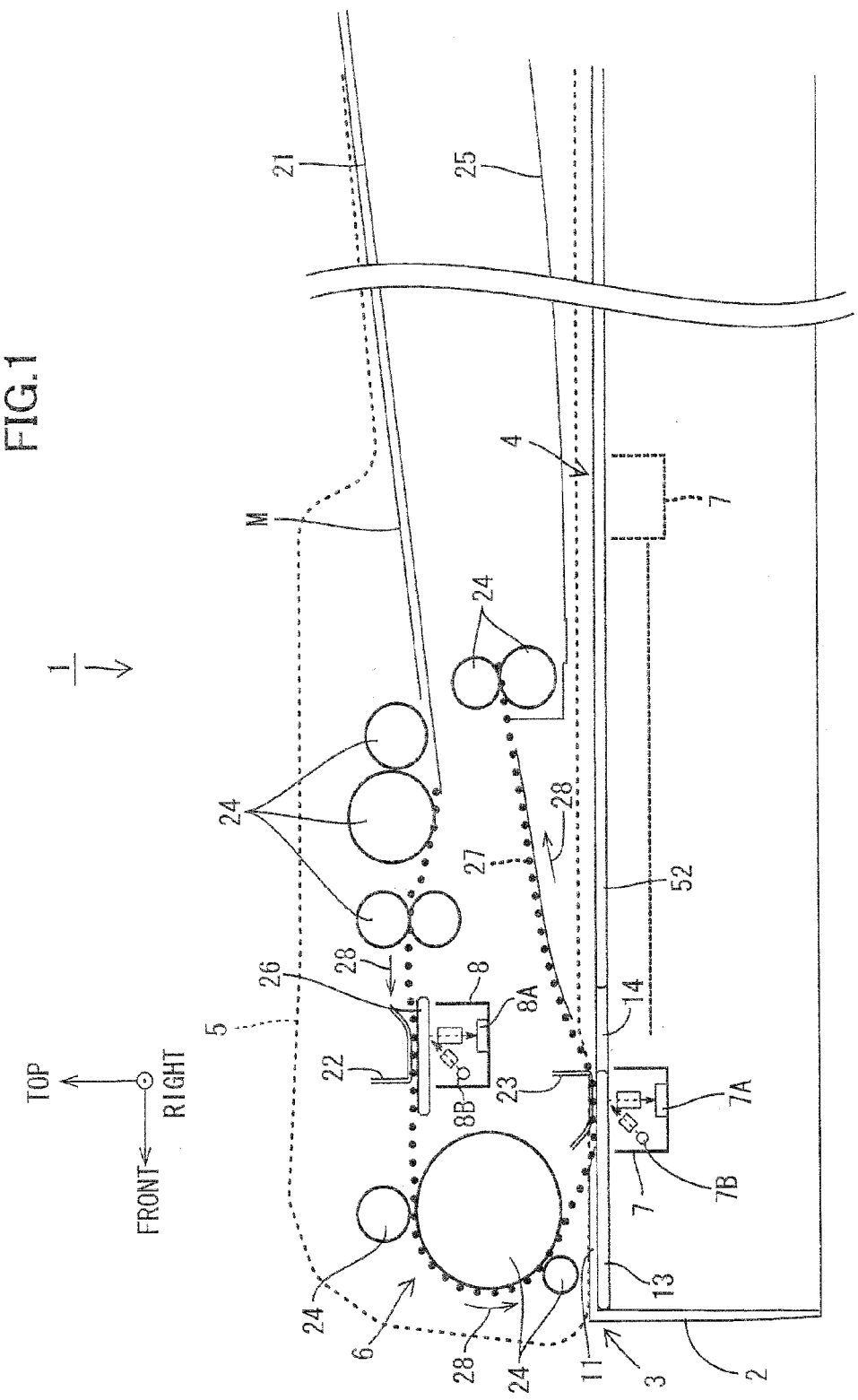
FIG. 1 is a partial cross-sectional view of a multifunction peripheral including an image processing device according to an embodiment of the present invention.

A multifunction peripheral (MFP) 1 according to an embodiment will be described while referring to FIGS. 1 through 7 wherein like parts and components are designated by the same reference numerals to avoid duplicating description. The left side of the MFP 1 in FIG. 1 will be considered the "front," the right side the "rear," the near side the "right," and the far side the "left." Further, the "top" and "bottom" of the MFP 1 in the following description will be based on the vertical directions in FIG. 1.

The MFP 1 is provided with multiple functions, including a printer function, a scanner function, a copier function, and a facsimile function. As shown in FIG. 1, the MFP 1 includes a main body 2 including an image forming unit (not shown), and an image-reading device 3 disposed on top of the main body 2 for reading manuscripts. The image-reading device 3 includes a flatbed unit (FB) 4, a cover 5, an automatic document feeder (ADF) 6, a front-surface reading device 7, and a rear-surface reading device 8.

The flatbed unit 4 includes a frame 11, a first platen glass 12, a second platen glass 13, and an intermediate frame 14 disposed between the first platen glass 12 and the second platen glass 13. Each of first and second platen glass 12 and 13 are formed of a transparent glass plate. The cover 5 can open and close over the flatbed unit 4 to reveal and cover the same.

The cover 5 is supported by the main body 2 so as to be pivoted to a closed position to cover the FB 4 and to an opened position to open the FB 4 and includes inside thereof the ADF 6 and rear-surface reading device 8. The ADF 6 includes a tray 21, pressing members 22 and 23, various rollers 24, a discharge tray 25, and a third platen glass 26 formed of a transparent glass plate. The tray 21 is a tray on which a manuscript M to be fed by the ADF 6 is placed. In the ADF 6, a feeding path 27 which is a path along which the manuscript M is fed by the rollers 24 from the tray 21 to discharge tray 25. Hereinafter, a direction along the feeding path 27 is referred to as a feeding direction. In FIG. 1, the feeding direction is denoted by arrow 28.

The rear-surface reading device 8 is disposed opposite to the pressing member 22 through the third platen glass 26. The rear-surface reading device 8 has a CIS (Contact Image Sensor), in which a plurality of read elements 8A are arranged in a direction orthogonal to the feeding direction, i.e., left-right direction and around which a plurality of RGB light sources 8B are arranged in the left-right direction. The rear-surface reading device 8 may have, for example, a CCD (Charge Coupled Device Image Sensor) in place of the CIS.

The front-surface reading device 7 is provided below the base frame 11 so as to be movable in the front-rear direction by a not illustrated movement mechanism. In FIG. 1, the front-surface reading device 7 is disposed opposite to the pressing member 23 through the second platen glass 13. The front-surface reading device 7 has the CIS, in which a plurality of read elements 7A are arranged in the left-right direction and around which a plurality of RGB light sources 7B are arranged in the left-right direction. The front-surface reading device 7 may have, for example, the CCD in place of the CIS.

With the above configuration, the image reading device 3 can execute both static read operation and feeding read operation. The static read operation is a mode of reading one surface (lower surface in FIG. 1) of the manuscript placed in a static state on the FB 4. In the static reading, the front-surface reading device 7 reads the lower surface of the manuscript while moving from a position illustrated in FIG. 1 to position denoted by broken line in the same figure. The feeding read operation is a mode of reading one surface or both surfaces of the manuscript by means of the front-surface reading device 7 and rear-surface reading device 8 while the ADF 6 feeds the manuscript placed on the tray 21 to the discharge tray 25. Hereinafter, the upper and lower surfaces of the manuscript M placed on the tray 21 in FIG. 1 are referred to as front surface and rear surface, respectively.

Figure 2:
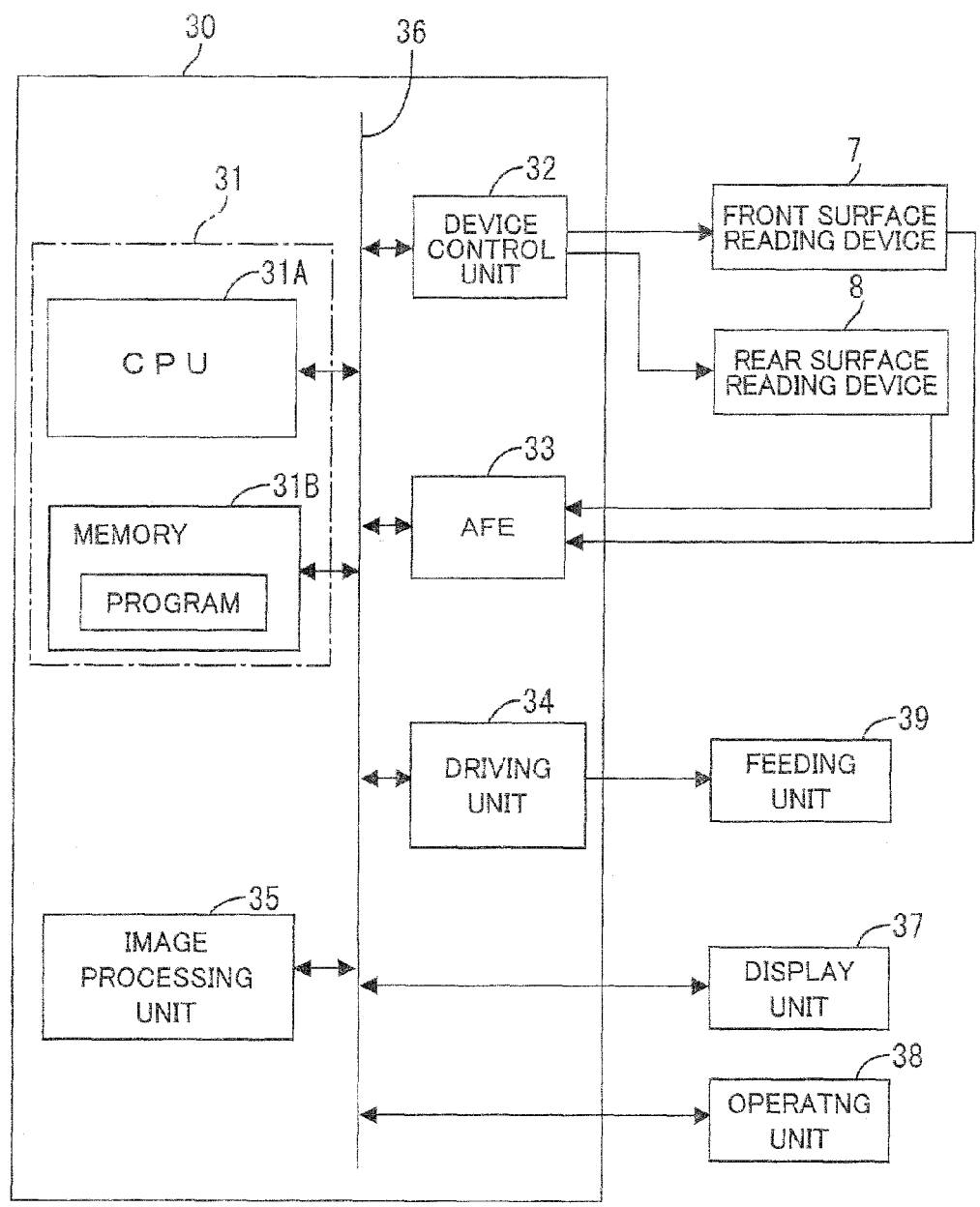
FIG. 2 is a block diagram showing an electrical structure of the multifunction peripheral.

As illustrated in FIG. 2, MFP 1 includes a control board 30. The control board 30 includes a control unit 31, a device control unit 32, an analog front-end (AFE) 33, a driving unit 34, and an image processing unit 35, which are connected with a display unit 37 and an operating unit 38 through a bus 36. The operating unit 38 is provided with a plurality of buttons for allowing a user to enter various commands and setting parameters. The display unit 37 is provided with a display or a lamp for allowing display of various setting screens and operating state of the machine.

The control unit 31 includes a central processing unit (CPU) 31A and a memory 31B. The memory 31B stores various programs for controlling the operation of MFP 1. The CPU 31A controls the individual components of MFP 1 according to the program read out from the memory 31B. The memory 31B has RAM and/or ROM.

The device control unit 32 is connected both to the reading devices 7 and 8 and transmits a signal for controlling turn-on/off of each of the light sources 7B and 8B and reading operation of each of the CIS 7A and CIS 8A based on instructions from the CPU 31A. Upon receiving the signal from the device control unit 32, the reading devices 7 and 8 turn on the light sources 7B and 8B and receive light reflected from the manuscript M fed on the feeding path 27 using the CIS 7A and CIS 8A. Further, the reading devices 7 and 8 output to the AFE 33 analog image data which is an analog signal corresponding to the amount of light received by the CIS 7A and CIS 8A.

The AFE 33 is connected both to the reading devices 7 and 8. The AFE 33 converts the analog read image data which is the analog signal output from each of the reading devices 7 and 8 into RGB read image data which is digital signal gradation data in an RGB colorimetric system. The RGB read image data is stored in the memory 31B through the bus 36.

The image processing unit 35 is, e.g., a hardware circuit dedicated to image processing and performs YCbCr conversion to be described later for the RGB read image data stored in the memory 31B. The RGB read image data is converted into YCbCr read image data. The YCbCr read image data resulting from the conversion is stored in the memory 31B. The driving unit 34 is connected to a feeding unit 39 that uses the various rollers 24 to feed the manuscript M in the feeding direction and feeds the manuscript M while controlling the feeding unit 39 based on instructions from the CPU 31A.

Figure 3:
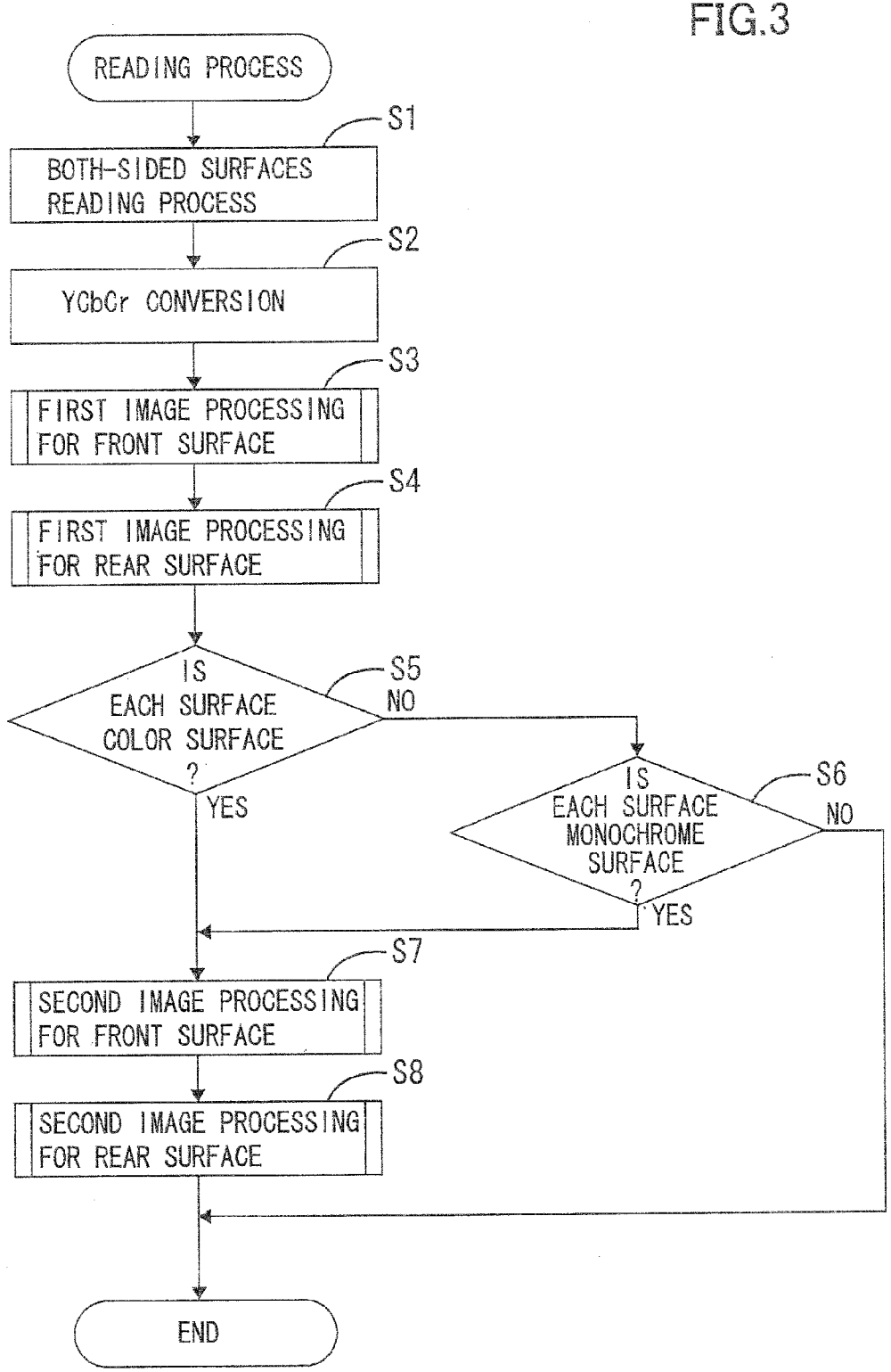
FIG. 3 is a flowchart illustrating steps in a reading process executed by the image processing device.

When a user places a single sheet of manuscript M on the tray 21 and uses the operating unit 38 to perform input operation of a double-sided reading instruction, the CPU 31A reads out the program and executes a reading process illustrated in FIG. 3. Through the reading process, the both sides of the manuscript M are read and, in parallel, color determination is performed to determine whether the expression color for expressing the image on each surface of the manuscript M is "color", "monochrome", or "blank (no color)".

To determine the expression color of the image on the manuscript M is to determine a manuscript type. The manuscript type refers to the type of each manuscript surface and includes, e.g., a color manuscript and a monochrome manuscript. The color manuscript means that the manuscript is expressed in color and refers to, e.g., a manuscript in which the ratio of a chromatic color area relative to the entire image is higher than or equal to a predetermined threshold. The monochrome manuscript means that the manuscript is expressed in monochrome and refers to, e.g., a manuscript, such as black-and-white manuscript or grayscale manuscript, in which the ratio of the chromatic color area relative to the entire image is lower than a predetermined threshold and the ratio of an achromatic color area relative to the entire image is higher than or equal to a predetermined threshold.

When the CPU 31A begins the reading process shown in FIG. 3, the CPU 31A starts execution of double-sided read control (S1). Specifically, the CPU 31A instructs the driving unit 34 to cause the feeding unit 39 to feed a single sheet of manuscript M from the tray 21 along the feeding path 27. The CPU 31A instructs the device control unit 32 to cause the front-surface reading device 7 and rear-surface reading device 8 to read the front and rear surfaces of the manuscript M, respectively. At this time, the front-surface reading device 7 and rear-surface reading device 8 each turn on the light sources in a time division manner to read the image in color mode. Then, the CPU 31A stores the RGB read image data of the front and rear surfaces which are sequentially output from the AFE 33 in the memory 31B.

The CPU 31A makes the image processing unit 35 execute the YCbCr conversion (S2). In this YCbCr conversion, the image processing unit 35 reads out and acquires the RGB read image data of the front and rear surfaces from the memory 31B, converts the RGB read image data from the RGB colorimetric system data into the YCbCr read image data in a YCbCr colorimetric system having brightness data Y and two color difference data (Cb and Cr), and stores the obtained YCbCr read image data in the memory 31B. In the embodiment, a range of the value of the brightness data Y is 0 to 255, and larger the value is, the higher the brightness becomes. A range of the value of each color difference data is −128 to +127, and the larger the absolute value, the more the number of red components or blue components becomes.

Figure 4:
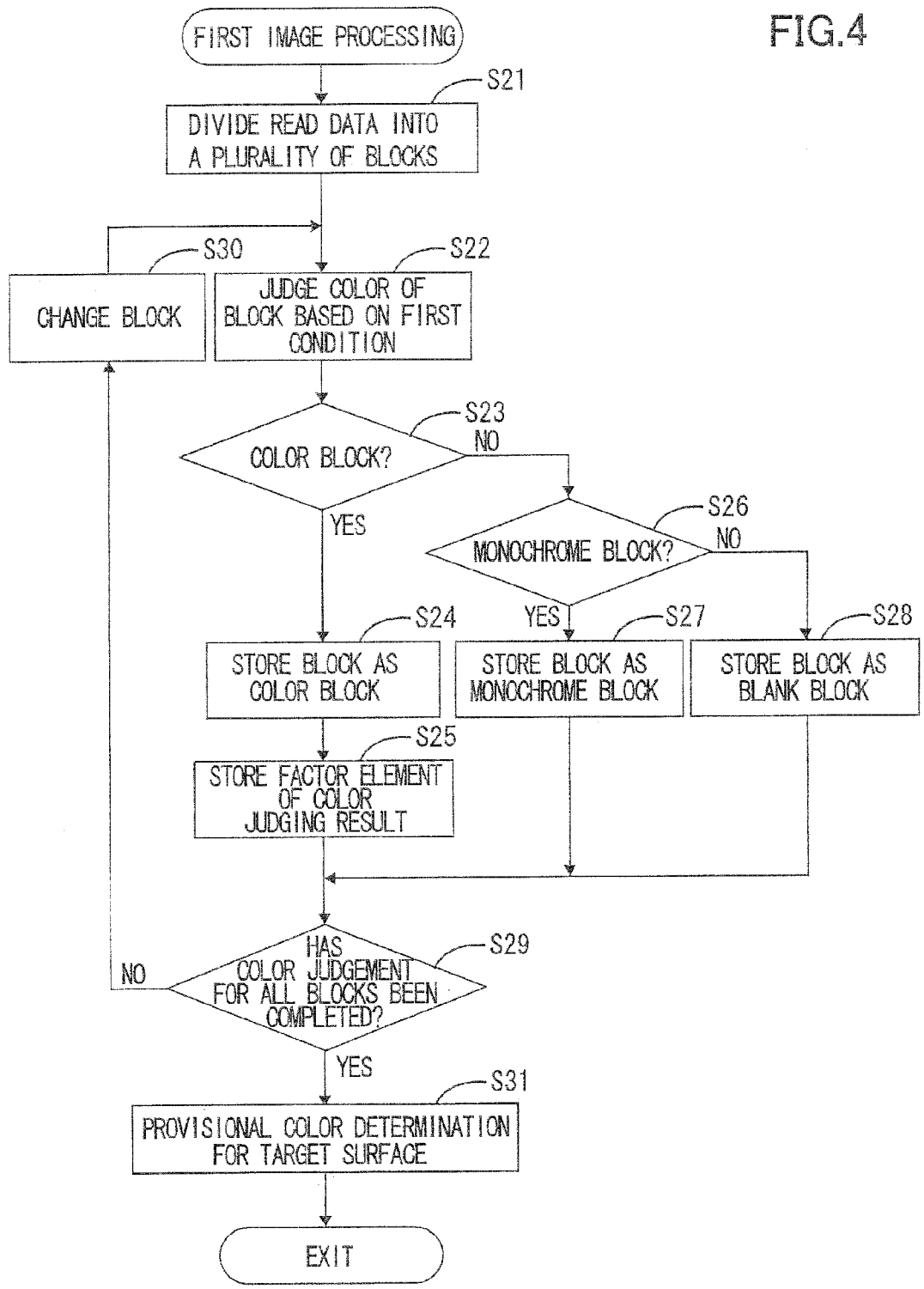
FIG. 4 is a flowchart illustrating steps in a first image processing in the reading process.

The CPU 31A executes first image processing illustrated in FIG. 4 for the front surface based on the YCbCr read image data of the front surface stored in the memory 31B (S3 in FIG. 3). Specifically, the CPU 31A executes block division processing of dividing the read image of the front surface into a plurality of blocks B based on the YCbCr read image data of the front surface (S21).

Figure 5:
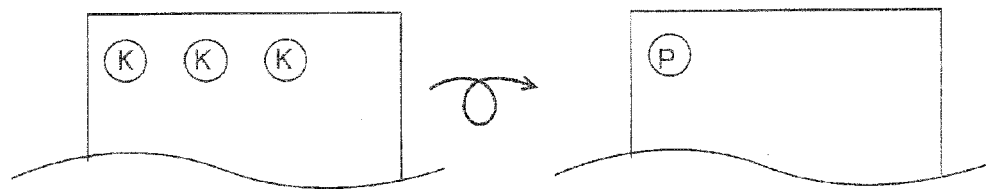
FIG. 5 is an explanatory diagram showing examples of a first surface and a second surface of manuscript read by a reading device of the multifunction peripheral.
Figure 6:
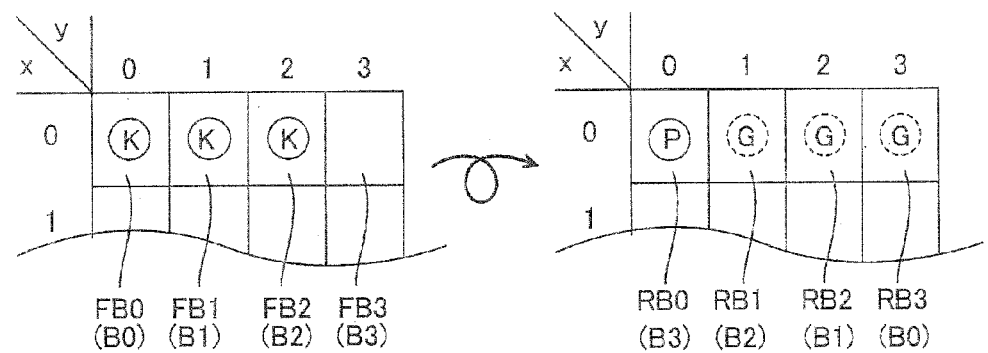
FIG. 6 is an explanatory diagram showing a plurality of blocks into which the first surface and second surface shown in FIG. 5 is divided.

FIG. 5 illustrates an example of front and rear surfaces of single sheet of the manuscript M. A black-and-white image has been printed on the front surface of the manuscript M, and a color image of pale pink has been printed on the rear surface thereof. FIG. 6 illustrates results of the block division processing for the YCbCr read image data of the front and rear surfaces of the manuscript M. In FIG. 6, (x,y) represents the position of each block in the YCbCr read image data. Blocks FB0 (x=0, y=0), FB1 (x=0, y=1), FB2 (x=0, y=2), and FB3 (x=0, y=3) of the YCbCr read image of the front surface are positioned directly opposite to blocks RB3 (x=0, y=3), RB2 (x=0, y=2), RB1 (x=0, y=1), and RB0 (x=0, y=0) of the YCbCr read image of the rear surface. In other words, the manuscript M includes four block part B0, B1, B2, and B3. The block part B4 corresponds to the blocks FB4 and RB0. The block part B0 corresponds to the blocks FB0 and RB3. The block part B1 corresponds to the blocks FB1 and RB2. The block part B3 corresponds to the blocks FB2 and RB1. Specifically, the front surface includes a plurality of regions each corresponding to respective ones of the plurality of front blocks. The rear surface includes a plurality of regions each corresponding to respective ones of the plurality of rear blocks. A region of front surface to which each of the plurality of front blocks corresponds is opposite a region of rear surface to which respective ones of the rear block corresponds.

The YCbCr read image data of the front surface includes the blocks FB0 to FB2 expressing a black image in the block parts B0 to B2 and the block FB3 expressing a blank image in the block part B3. The brightness data Y, color difference data Cb, and color difference data Cr of the black image are assumed to be 0, 0, and 0, respectively, and those of the blank image are 255, 0, and 0, respectively. The YCbCr read image of the rear surface includes the block RB0 expressing a pale pink image in the block part B3 and the blocks RB1 to RB3 expressing a gray image resulting from the show-through in the blocks B2 to B0. The brightness data Y, color difference data Cb, and color difference data Cr of the pale pink image are assumed to be 235, −12, and +14, respectively, and those of the gray image are 230, 0, and 0, respectively.

After starting the execution of the block division processing, the CPU 31A sequentially selects the blocks starting from a block (e.g., block FB0) at the initial position as target blocks and executes for each of the target blocks first block determination processing of performing color determination using a first determination condition (S22). The first determination condition includes a color element condition for pixels contained in each block FB and a block color condition for each block FB. When each pixel contained in the target block FB satisfies the color element condition of a specific expression color, the CPU 31A determines that each pixel is a pixel of the specific expression color, that is, a color pixel or a black-and-white pixel. Otherwise, the CPU 31A determines that the pixel is a pixel of neither the color pixel nor black-and-white pixel, that is, a blank pixel. The color element condition includes, for example, whether a value concerning the color element of each pixel falls within or outside a prescribed range.

For example, the color element condition includes the following conditions:

color pixel condition: Cb value=outside range of −10 to +10 or Cr value=outside range of −10 to +10; and black-and-white pixel condition: Cb value=within range of −10 to +10, and Cr value=within range of −10 to +10, and Y value=outside range of 240 to 255.

When the target block satisfies the block color condition of a specific expression color, the CPU 31A determines that the target block is a block corresponding to a part of manuscript whose color is a specific expression color (hereinafter, referred to as specific color block), that is, a color block or a black-and-white block; otherwise, the CPU 31A determines that the target block is a block of not a specific expression color (hereinafter, referred to non-specific color block), that is, a blank block. The block color condition includes, for example, whether the percentage (hereinafter, referred to as first pixel percentage) of the number of pixels of the specific expression color relative to the number of all or some of the pixels of each block falls within or outside a first prescribed range. When the number of all or some of the pixels is a fixed value, the CPU 31A can indirectly determine whether the target block FB satisfies the above block color condition by determining whether the number of pixels of the specific expression color is equal to or less than a predetermined threshold.

For example, the block color condition includes the following conditions:

color block condition: a percentage of number of color pixels in target block relative to number of all pixels therein=5% or more; and black-and-white block condition: target block is not color block, and a percentage of number of black-and-white pixels in target block relative to number of all pixels therein=5% or more.

Other than the method of the present embodiment, various known color determination method may be used to perform the color determination of the target block.

When determining in the first block determination processing that the target block is the color block (YES in S23), the CPU 31A stores block information indicating that the target block is the color block in the memory 31B (S24). In addition, the CPU 31A executes information storage processing of storing in the memory 31B correspondence information relating the color element (hereinafter, referred to as factor element) that has served as a key factor of the determination result in S23 to the target block (S25).

Specifically, when the target block has only a blue color element, the color difference data Cb is used as the factor element. When the target block has only a red color element, the color difference data Cr is used as the factor element. When the target block has blue and red color elements, the color difference data Cb and color difference data Cr are used as the factor element. The processing of steps S24 and S25 may be performed in any order or in parallel.

When the CPU 31A determines that the target block is not the color block (No in S23), the CPU 31A determines whether or not the target block is the black-and-white block in S26. When determining in the above first block determination processing that the target block is the black-and-white block (YES in S26), the CPU 31A stores block information indicating that the target block is the black-and-white block in the memory 31B (S27). When determining in the above first block determination processing that the target block is the blank block (NO in S26), the CPU 31A stores block information indicating that the target block is the blank block in the memory 31B (S28). In the case where the read image of the front surface is as illustrated in FIG. 6, the blocks FB0 to FB2 are all determined as the black-and-white blocks due to the black pixels of the front surface, and block FB3 is determined as the blank block.

When determining that the first block determination process for all blocks FB has not been completed after the block determination processing for the target block (NO in S29), the CPU 31A sets the next block FB as the target block (S30) and returns to S22. On the other hand, when determining that the first block determination process for all blocks FB has been completed (YES in S29), the CPU 31A executes a provisional color determination process for the front surface (S31). Specifically, when the ratio of the number of specific color blocks (hereinafter, referred to as the first block percentage) relative to the number of all the blocks of the read image of the front surface is higher than or equal to a reference value, the CPU 31A determines that the expression color (manuscript type) of the front surface is the specific expression color surface. However, when the first block percentage is lower than the reference value, the CPU 31A determines that the expression color of the front surface is not the specific expression color surface. When the number of all the blocks is a fixed value, the CPU 31A can indirectly determine whether the expression color of the front surface is the specific expression color surface by determining whether the number of the specific color blocks is less than or equal to a predetermined threshold.

In this embodiment, the following color determination conditions are used for each specific expression color:

color image condition: a percentage of number of color blocks relative to number of all blocks on target surface=2% or more;

black-and-white image condition: color image condition is not satisfied, and a percentage of number of black-and-white blocks relative to number of all blocks on target surface=2% or more In the case where the read image of the front surface is as illustrated in FIG. 6, a color of the front surface is determined as the black-and-white image, and this determination coincides with the expression color of the front surface of the manuscript M illustrated in FIG. 5. After completion of the provisional color determination process for the front surface, the CPU 31A ends the first image processing for the front surface and proceeds to S4 of FIG. 3.

After completion of the first image processing for the front surface, the CPU 31A executes the first image processing for the rear surface as illustrated in FIG. 4 (S4). The first image processing for the rear surface differs from that for the front surface only in the target surface, so that a detailed description thereof will not be given herein. In the case where the first block determination process (S22) is performed for the YCbCr read image of the rear surface as illustrated in FIG. 6, the block RB0 is determined as the color block due to the pale pink pixels, and blocks RB1 to RB3 are all determined as the black-and-white blocks due to the gray pixels caused by the show-through of the black image in the front blocks FB2-FB0. As a result, an image formed on the rear surface is determined as the black-and-white image in S31, and this determination does not coincide with the expression color of the rear surface of the manuscript M illustrated in FIG. 5. That is, the expression color of the rear surface has erroneously been determined. In the information storage process of S25, the correspondence information between the block RB0 determined as the color block and color difference data Cr is stored in the memory 31B. The process of steps S3 and S4 may be performed in any order.

After completion of the first image processing for the rear surface, the CPU 31A determines whether the front and rear surfaces assume the same specific expression color (that is, whether both surfaces are determined as the color image or as the black-and-white image) in the above first image processing (S5 and S6). When determining that the front and rear surfaces assume the same specific expression color (YES in S5, or, No in S5 and YES in S6), the CPU 31A executes the second image processing illustrated in FIG. 7 for the front surface (S7).

In the second image processing, the CPU 31A selects a block at the initial position from the blocks on the read image of the front surface as the target block. Subsequently, the CPU 31A refers to the block information concerning the front surface to determine whether the target block has been determined as the specific color block (that is, determined as the color block or black and white block) in the first block determination processing (S41).

When determining that the target block is the specific color block (YES in S41), the CPU 31A determines whether or not the target block is a corresponding block. Specifically, the CPU 31A determines whether or not the results of the first block determination processing are the same between the target block and a rear surface block directly opposite to the target block (S42). In other words, the CPU 31A determines whether or not the target block and the rear surface block directly opposite thereto (hereinafter, referred to as opposite block) are the same specific color block. In the example of FIG. 5, the CPU 31A determines whether or not the target block FB0 and the RB3 corresponding to the same block part B0 are same specific color block. The corresponding block refers to a block positioned directly opposite to the rear surface block that has been determined as the specific color block in the first block determination process. In other words, the corresponding block refers to a front block corresponding to a rear block judged to be a specific color block. Hereinafter, a block other than the corresponding block is referred to as non-corresponding block. In other words, the non-corresponding block refers to a front block corresponding to a rear block judged not to be specific color block.

When determining that the target block and opposite block are the same specific color block (YES in S42), the CPU 31A sets a second determination condition under which the opposite block is more difficult to be determined as the specific color block than under the first determination condition (S43). Specifically, the CPU 31A refers to the block information and correspondence information to set the second determination condition wherein only the color element condition concerning the factor element of the opposite block is more severe than in the first determination condition. In other words, each of the specified color first block and the specified color second block including at least one of the plurality of color elements. Each of the first specified color and the second specified color is defined by a combination of the plurality of color elements. The first determination condition includes predetermined color determination conditions.

Specifically, the following changes are made to the first determination condition to set the second determination condition:

in case where factor element is color difference data Cb: "Cb value=range of −10 to +10" is changed to "Cb value=range of −10 to +15";

in case where factor element is color difference data Cr: "Cr value=range of −10 to +10" is changed to "Cr value=range of −10 to +15";

in case where factor element is brightness data Y: "Y value=range of 240 to 255" is changed to "Y value=range of 230 to 255".

Then, the CPU 31A performs the color determination for the target block under the second determination condition (S44) and proceeds to S45. On the other hand, when determining that the target block is not the specific color block (NO in S41) or determining that the target block and opposite block are not the same specific color block (NO in S42), the CPU 31A proceeds to S45 without executing the setting of the second determination condition (S43) and second block determination process (S44).

In S45, the CPU 31A determines whether or not the process of S41 to S44 have been completed for all the blocks FB of the front surface. When the CPU 31A determines that the processes of S41 to S44 have not been completed for all the blocks FB (NO in S45), the CPU 31A sets the next block FB as the target block (S46) and returns to S41. On the other hand, when determining that the processes of S41 to S44 have been completed for all the blocks FB (YES in S45), the CPU 31A executes color determination process for the front surface (S47).

Specifically, the CPU 31A calculates the sum of the number of blocks that have been subjected to the second block determination process and that have been determined as the specific color blocks in the second block determination process and the number of blocks that have not been subjected to the second block determination process and that have been determined as the specific color blocks in the first block determination process. Then, when the ratio of the above sum relative to the number of all the blocks of the YCbCr read image of the front surface is equal to or more than the reference number, the CPU 31A determines that the expression color of the front surface is the specific expression color; otherwise, the CPU 31A determines that the expression color of the front surface is not the specific expression color. The color determination condition used in the color determination process (S47 in FIG. 7) is the same as that in the provisional color determination process (S31 in FIG. 4). After completion of the color determination process for the front surface, the CPU 31A ends the second image processing for the front surface and proceeds to S8 of FIG. 3.

In S41 and S42, in the case where the read images of the front and rear surfaces are as illustrated in FIG. 6, the front blocks FB0 to FB2 are the black-and-white blocks and are thus determined as the specific color blocks, and further as those determined as the same specific color block as that of the opposite rear blocks RB3 to RB1. Therefore, the second block determination process is executed for the front surface blocks FB0 to FB2 under the second determination condition. The second determination condition is a condition under which the opposite rear blocks RB3 to RB1 are each difficult to be determined as the black-and-white block and, specifically, "Y value=range of 240 to 255" of the first determination condition is changed to "Y value=range of 230 to 255". Each of the front surface blocks FB0 to FB2 includes the black image and is therefore determined as the black-and-white block also in this second block determination process. As a result, in the color determination process, the front surface is determined as the black-and-white image surface as in the case of the provisional color determination process (S31 in FIG. 4), and this determination coincides with the expression color of the front surface of the manuscript M illustrated in FIG. 5.

After completion of the second image processing for the front surface in S7 of FIG. 3, the CPU 31A executes the second image processing illustrated in FIG. 7 for the rear surface (S8). The second image processing for the rear surface differs from that for the front surface only in the target surface, so that a detailed description thereof will not be given herein. In S41 and S42 in FIG. 7, in the case where the YCbCr read image data of the rear surface is as illustrated in FIG. 6, the block RB0 is the color block, and blocks RB1 to RB3 are the black-and-white blocks, so that the rear surface blocks RB0 to RB3 are determined as the specific color blocks. Further, each of blocks RB1 to RB3 is determined as the specific color block same as that of the respective opposite front block FB2 to FB0. Therefore, the second block determination processing is executed for the rear surface blocks RB1 to RB3 under the second determination condition.

The second determination condition is a condition under which the front surface blocks FB2 to FB0 are each difficult to be determined as the black-and-white block and, specifically, "Y value=range of 240 to 255" of the first determination condition is changed to "Y value=range of 230 to 255". The Y value of the gray image is 230 as described above, so that the rear surface blocks RB1 to RB3 each do not satisfy the black-and-white pixel condition and are each therefore determined as the blank block. As a result, unlike the case of the temporary color determination process (S31 in FIG. 4), the rear surface is determined as the color image due to the pale pink image of the block RB0 in this color determination process (S47 in FIG. 7), and this determination coincides with the expression color of the rear surface of the manuscript M illustrated in FIG. 5. The processing of steps S7 and S8 may be performed in any order.

After completion of the second image processing for the rear surface, the CPU 31A ends the reading process. After that, the CPU 31A deletes any of the brightness data Y and two color difference data as unnecessary data based on a result of the color determination process shown in S47. In the case where the read images of the front and rear surfaces are as illustrated in FIG. 6, the front surface is determined as the black-and-white image, so that of the YCbCr read image data, two color difference data are deleted while only the brightness data Y is kept stored. As a result, the amount of the YCbCr read image data to be stored in the memory 31B can be reduced. A configuration may be possible in which the CPU 31A converts the YCbCr read image data into the RGB read image data and any one of the RGB data is kept stored. The rear surface is determined as the color image, so that the brightness data Y and two color difference data are not deleted, that is, the YCbCr read image data is kept stored in the memory 31B.

Referring back to FIG. 3, when determining that the front and rear surfaces do not assume the same specific expression color (NO in S5 and NO in S6), the CPU 31A ends the reading process without executing the second image processing for the front and rear surfaces. Then, the CPU 31A deletes any of the brightness data Y and two color difference data as unnecessary data based on a result of the temporary color determination process (S31).

According to the embodiment, the second determination condition which is more severe than the first determination condition and under which a second surface block (rear surface block) that has been determined as the specific color block in the first block determination process is difficult to be determined as the specific color block is set. Then, for a first surface (front surface in the embodiment) opposite to the second surface (rear surface in the embodiment), the second block determination process of determining whether the corresponding block positioned directly opposite to the second surface block satisfies the second determination condition is executed. In the case where the expression color of the first surface of the manuscript is not the specific expression color while the expression color of the second surface is the specific expression color as a result of the second block determination process, the expression color of the first surface can be prevented from being erroneously determined as the specific expression color due to show-through of the specific expression color of the second surface as compared to the case where the color determination is made for the first surface block only using the first determination condition.

In the first block determination process, for one surface, whether not only the non-corresponding blocks, but also the corresponding blocks satisfy the first determination condition is determined. As a result, the first block determination process for the corresponding blocks of the one surface can be completed more easily than a configuration where the corresponding blocks are excluded from the target of the first block determination process.

In the case where the expression colors of both side surfaces of the manuscript are each determined as the specific expression color (S5 and S6), there is a high possibility that erroneous determination has been made due to the show-through. Only in such a case, the second block determination process and color determination process are executed (FIG. 7) in the embodiment, and the expression color of one surface is determined based on the results of the above processes; otherwise, the second block determination process and color determination process are not executed, and the expression color of the one surface is determined based on the results of the provisional color determination process (FIG. 4). As a result, a processing load on the control unit 31 can be reduced as compared to a configuration in which both the second block determination process and color determination process are always executed.

The condition wherein only the color element condition concerning the factor element is made more severe than in the first determination condition is set as the second determination condition (S43). This second determination condition is used for the determination of the corresponding blocks (S44). As a result, as compared to a configuration in which the color element condition concerning the color element other than the factor element is made sever, the color of one surface can be determined with higher accuracy. For example, assume that the block FB3 of the front surface in FIG. 6 includes a blue image. In this case, if not only the color element condition concerning not only the Cb but also Cr is made severe in the color determination for the rear surface block RB0, there is a possibility that the pale pink pixel is determined as the blank pixel to cause the rear surface to be erroneously determined as the blank image. On the other hand, since the color element condition concerning only the Cb is made severe in the embodiment, an occurrence of the above erroneous determination can be suppressed.

Further, in the second block determination process, only the corresponding blocks are determined whether to satisfy the second determination condition. As a result, as compared to a configuration in which both the corresponding and non-corresponding blocks are subjected to the second block determination process, a processing load on the control unit 31 can be reduced.

In the second block determination process, the CPU 31A determines, for only the corresponding blocks that have been determined as those assuming the same expression color as the opposite blocks in the first block determination process, whether or each corresponding block satisfies the second determination condition. As a result, as compared to a configuration in which all the corresponding blocks are subjected to the second block determination process regardless of whether the corresponding blocks assume the same expression color, a processing load on the control unit 31 can be reduced.

Further, the color of one surface of the manuscript can be determined as one of "color", "monochrome", and "blank". In the MFP 1 incorporating the image reading device 3, the expression color of one surface can be prevented from being erroneously determined as the specific expression color due to show-through of the image of the specific expression color of the opposite surface. Further, an occurrence of the erroneous color determination due to show-through can be suppressed for both sides of the manuscript M.

While the invention has been described in detail with reference to the embodiment thereof, it would be apparent to those skilled in the art that various changes and modifications may be made therein without departing from the spirit of the invention.

In the above-described embodiment, the MFP 1 has been taken as an example of an image processing device. However, the image processing device is not limited to the MFP 1, but may be a single image reading device, a printer that acquires read image data from an image processing apparatus, or an information processor such as a personal computer. In this case, the printer regards two read image data that have been acquired sequentially within a predetermined time or that have been related to each other as those for the same manuscript.

In the above-described embodiment, the MFP 1 that has the FB 4 and thus capable of performing the static reading has been taken as an example of the image processing device.

However, the image processing device need not always be provided with the FB 4. For example, a configuration may be adopted in which two image reading devices are disposed opposite to each other across the feeding path of the ADF 6. Further, the image processing device may have a configuration in which one surface of the manuscript is read by an image reading device and thereafter the opposite surface of the manuscript reversed by a manuscript reverse mechanism such as a switchback mechanism is read by the image reading device.

Further, instead of the AFE 33, the image processing device may include an external storage device storing the read image data and/or a connection unit communicably connected to an external device transmitting the read image data, such as a USB interface.

In the above embodiment, the control unit 31 and image processing unit 35 performs the reading process shown in FIG. 3. However, only the control unit 31 may be used to execute the reading process. Further, the control 31 for performing the reading process may have a plurality of CPUs, may have a hardware circuit such as an ASIC (Application Specific Integrated Circuit), or may have both the hardware circuit and CPU. For example, at least two of the block division process, first block determination process, second block determination process, and color determination process may be executed by different CPUs, different hardware circuits, or may be separately executed by the CPU and hardware circuit.

In the above embodiment, a case where the double-sided reading instruction is input has been described. However, even in the case where a single-sided reading instruction is input in the feeding read operation, the first image processing and second image processing may be executed.

In the above embodiment, the control unit 31 sets the "color" and "monochrome" as the specific expression color in the first and second image processing. Alternatively, however, the control unit 31 may set only one of the "color" and "monochrome" as the specific expression color and determine whether the expression color of each surface of the manuscript M is the "color" or "monochrome". Further, the control unit 31 may set "monochromatic multiple (three or more) gradation pattern" such as a grayscale pattern and "monochromatic two-gradation pattern" such as a text with only black and white colors as the specific expression color to be subjected to the determination process.

In the above-described embodiment, the control unit 31 executes each image processing shown in FIGS. 4 and 5 for the image data in the YCbCr colorimetric system. However, the image data to be subjected to the image processing in the present invention is not limited to this, but the control unit 31 executes each image processing for an image data in an RGB colorimetric system. Further, other than the RGB colorimetric system and YCbCr colorimetric system, image data in other colorimetric systems such as a YPbPr colorimetric system may be used. However, in the case where the image processing is performed for the image data in the RGB colorimetric system, three data of R, G, and B need to be referred to for determining whether the image data is "color" or "monochrome". In the case of the present invention, whether the image data is "color" or "monochrome" can be determined only from the color difference data, so that each image processing can be done comparatively simply.

In the above-described embodiment, each image processing is applied to the entire read image of each surface. Alternatively, however, each image processing may be applied only to a part of the read image of each surface, such as a center portion thereof at which an image is highly likely to exist.

In the above-described embodiment, the control unit 31 stores the block information and correspondence information in the memory 31B in the information storage process. Alternatively, however, the block information may be stored in a storage circuit constructed by a logical circuit.

In the above-described embodiment, the control unit 31 executes the second image processing in the case where it has been determined that the front and rear surfaces assume the same specific expression color in S5 and S6 of FIG. 3. Alternatively, however, the control unit 31 may execute the second image processing even in the case where the front and rear surfaces assume the different specific expression colors, that is, "color" and "monochrome", respectively, or vice versa. Further, the control unit 31 may be configured to always execute the second image processing without performing the determinations of S5 and S6 of FIG. 3.

In the above-described embodiment, the second block determination process is executed (S43) in the case where it has been determined that the target block is the corresponding block and the results of the first block determination process are the same between the target block and a rear surface block directly opposite to the target block (YES in S41 and YES in S42). Alternatively, however, the second block determination processing may be executed when the target block is the corresponding block.

In the above-described embodiment, the control unit 31 executes the first block determination process for the corresponding blocks and non-corresponding blocks (FIG. 4). Alternatively, however, in the case of, e.g., the single-sided reading, the control unit 31 may execute the first block determination process first for the rear surface and thereafter execute the first block determination process for the non-corresponding blocks of the front surface and second block determination process for the corresponding blocks.

In the above-described embodiment, the second determination condition is made more severe only in the color element condition than the first determination condition. Alternatively, however, the second determination condition may be a condition in which only the block color condition is made more severe or in which both the color element condition and block color condition are made more severe.

In the above-described embodiment, a program stored in the memory 31B having the RAM or ROM. However, the image processing program may be stored in a non-volatile memory such as a hard disk drive or a flash memory (registered trademark) or a storage medium such as a CD-R.

What is claimed is:

1. An image processing device comprising:
an acquiring unit configured to acquire first read data indicative of an image formed on a first surface of a single sheet of manuscript and configured to acquire second read data indicative of an image formed on a second surface of the single sheet of the manuscript; and
a processor configured to function as:
a dividing unit configured to divide the first read data into a plurality of first blocks and to divide the second read data into a plurality of second blocks, each of the plurality of second blocks corresponding to respective ones of the plurality of first blocks, the first surface including a plurality of first regions each corresponding to respective ones of the plurality of first blocks, the second surface including a plurality of second regions each corresponding to respective ones of the plurality of second blocks, a first region to which each of the plurality of first blocks corresponds being opposite a second region to which respective ones of the second block corresponds;

a first judging unit configured to judge whether or not each second block is a specified color second block based on a first determination condition, the specified color second block corresponding to a second region that is expressed by a first specified color, the first judging unit judging that a second block is the specified color second block if the second block satisfies the first determination condition, the first judging unit judging that a second block is not the specified color second block if the second block does not satisfy the first determination condition;

a second judging unit configured to judge whether or not each first block corresponding to a second block judged not to be the specified color second block is a specified color first block based on the first determination condition, the specified color first block corresponding to a first region expressed by a second specified color, the second judging unit judging that a first block is the specified color first block if the first block satisfies the first determination condition, the second judging unit judging that a first block is not the specified color first block if the first block does not satisfy the first determination condition;

a setting unit configured to set a second determination condition for each first block corresponding to a second block judged to be the specified color second block by the first judging unit, each second block being more difficult to be judged as the specific color second block based on the respective second determination condition than based on the first determination condition;

a third judging unit configured to judge whether or not each first block corresponding to a second block judged to be the specified color second block by the first judging unit is the specified color first block based on the respective second determination condition, the third judging unit judging that a first block is the specified color first block if the first block satisfies the second determination condition, the third judging unit judging that a first block is not the specified color first block if the first block does not satisfy the second determination condition;

a calculating unit configured to calculate a first ratio of a total number of the specified color first block judged by the second judging unit and the third judging unit to a total number of the plurality of first blocks; and a determining unit configured to determine that the first surface is a specified color first surface when the first ratio is greater than or equal to a prescribed value, an image formed on the specified color first surface having a second ratio higher than a predetermined value, the second ratio being a ratio of an area expressed by the second specified color relative to the entire of the image formed on the specified color first surface.

2. The image processing device according to claim 1, wherein the second judging unit judges whether or not each of the plurality of first blocks is the specified color first block based on the first determination condition.

3. The image processing device according to claim 2, wherein the processor is configured to further function as:

a first provisional calculating unit configured to calculate a third ratio of a total number of the specified color first block judged by the second judging unit to the total number of the plurality of first blocks;

a first provisional determining unit configured to determine that the first surface is the specified color first surface when the third ratio is greater than or equal to the prescribed value;

a second provisional calculating unit configured to calculate a fourth ratio of a total number of the specified color second block judged by the first judging unit to a total number of the plurality of second blocks;

a second provisional determining unit configured to determine that the second surface is a specified color second surface when the fourth ratio is greater than or equal to the prescribed value, an image formed on the specified color second surface having a fifth ratio higher than a predetermined value, the fifth ratio being a ratio of an area expressed by the first specified color relative to the entire of the image formed on the specified color second surface;

wherein, if the first provisional determining unit determines that the first surface is the specified color first surface and the second provisional determining unit determines that the second surface is the specified color second surface, the third judging unit judges whether or not each first block corresponding to a second block judged to be the specified color second block is the second specified color first block based on the respective second determination condition;

wherein, if the first provisional determining unit determines that the first surface is not the specified color first surface and/or the second provisional determining unit determines that the second surface is not the specified color second surface, the determining unit determines that the first surface is the specified color first surface when the first provisional determining unit determines that the first surface is the specified color first surface and determines that the first surface is not the specified color first surface when the first provisional determining unit determines that the first surface is not the specified color first surface, the third judging unit and the calculating unit failing to perform a judgment and calculation, respectively.

4. The image processing device according to claim 1, wherein the first determination condition is different from the second determination condition, each of the first determination condition and second condition including a plurality of color determination conditions each set for respective ones of a plurality of color elements, the first determination condition including predetermined color determination conditions, each of the specified color first block and the specified color second block including at least one of the plurality of color elements, each of the first specified color and the second specified color being defined by a combination of the plurality of color elements, wherein the setting unit sets, for each first color block corresponding to a second block to be the specified color second block judged by the first judging unit, a color determination condition set for a color element included in the respective second block judged to be the specified color second block by the first judging unit, the color determination that is included in the respective second determination condition and is set for the color element being different from a color determination condition that is included in the first determination condition and is set for a color element same as the color element for which the color determination of the second determination is set.

5. The image processing device according to claim 1, wherein the third judging unit fails to judge whether or not each first block corresponding to a second block judged not to be the specified color second block is the specified color first block.

6. The image processing device according to claim 1, wherein the first specified color includes monochrome colors within a first prescribed range of colors and chromatic colors within a second prescribed range of colors, the second specified color including the monochrome colors.

7. The image processing device according to claim 6, wherein the processor is configured to further function as a fourth judging unit configured to judge, for each first block corresponding to a second block judged to be the specified color second block by the first judging unit, whether or not a color of the respective second block is included in the monochrome colors;
 wherein the third judging unit judges whether or not each first block corresponding to a second block whose color is included in the monochrome colors is the specified color first block based on the second determination condition, the third judging unit failing to judge whether or not each first block corresponding to a second block whose color is not included in the monochrome colors is the specified color first block.

8. The image processing device according to claim 1, wherein the first specified color includes monochrome colors within a first prescribed range of colors and chromatic colors within a second prescribed range of colors, the second specified color including the chromatic colors.

9. The image processing device according to claim 8, wherein the processor is configured to further function as a fourth judging unit configured to judge, for each first block corresponding to a second block judged to be the specified color second block by the first judging unit, whether or not a color of the respective second block is included in the chromatic colors;
 wherein the third judging unit judges whether or not each first block corresponding to a second block whose color is included in the chromatic colors is the specified color first block based on the second determination condition, the third judging unit failing to judge whether or not each first block corresponding to a second block whose color is not included in the chromatic colors is the specified color first block.

10. The image processing device according to claim 1, further comprising a reading device configured to read the first surface and the second surface to generate the first read data and the second read data;
 wherein the acquiring unit acquires the first read data and the second read data generated by the reading unit.

11. The image processing device according to claim 1, wherein the second judging unit judges whether or not each of the plurality of first blocks is the specified color first block based on the first determination condition, the second judging unit judging that a first block is the specified color first block if the first block satisfies the first determination condition, the second judging unit judging that a first block is not the specified color first block if the first block does not satisfy the first determination condition;
 wherein the setting unit further sets a third determination condition for each second block corresponding to a first block judged to be the specified color first block by the second judging unit, each first block being more difficult to be judged as the specific color first block based on the respective third determination condition than based on the first determination condition;
 wherein the third judging unit further judges whether or not each second block corresponding to a first block judged to be the specified color first block by the second judging unit is the specified color second block based on the respective third determination condition, the third judging unit judging that a second block is the specified color second block if the second block satisfies the third determination condition, the third judging unit judging that a second block is not the specified color second block if the second block does not satisfy the third determination condition;
wherein the calculating unit further calculates a sixth ratio of a total number of the specified color second block judged by the third judging unit to a total number of the plurality of second blocks;
wherein the determining unit further determines that the second surface is a specified color second surface when the sixth ratio is greater than or equal to the prescribed value, an image formed on the specified color second surface having a seventh ratio higher than a predetermined value, the seventh ratio being a ratio of an area expressed by the first specified color relative to the entire of the image formed on the specified color second surface.

12. An image processing method comprising:
acquiring first read data indicative of an image formed on a first surface of a single sheet of manuscript and acquiring second read data indicative of an image formed on a second surface of the single sheet of the manuscript;
dividing, by a processor, the first read data into a plurality of first blocks and dividing the second read data into a plurality of second blocks, each of the plurality of second blocks corresponding to respective ones of the plurality of first blocks, the first surface including a plurality of first regions each corresponding to respective ones of the plurality of first blocks, the second surface including a plurality of second regions each corresponding to respective ones of the plurality of second blocks, a first region to which each of the plurality of first blocks corresponds being opposite a second region to which respective ones of the second block corresponds;
(a) judging whether or not each second block is a specified color second block based on a first determination condition, the specified color second block corresponding to a second region that is expressed by a first specified color, a second block being judged to be the specified color second block if the second block satisfies the first determination condition, a second block being judged not to be the specified color second block if the second block does not satisfy the first determination condition;
(b) judging whether or not each first block corresponding to a second block judged not to be the specified color second block is a specified color first block based on the first determination condition, the specified color first block corresponding to a first region expressed by a second specified color, a first block being judged to be the specified color first block if the first block satisfies the first determination condition, a first block being judged not to be the specified color first block if the first block does not satisfy the first determination condition;
setting a second determination condition for each first block corresponding to a second block judged to be the specified color second block in the (a) judging, each second block being more difficult to be judged as the specific color second block based on the respective second determination condition than based on the first determination condition;
(c) judging whether or not each first block corresponding to a second block judged to be the specified color second block in the (a) judging is the specified color first block based on the respective second determination condition, a first block being judged to be the specified color first block if the first block satisfies the second determination condition, a first block being judged not to be the specified color first block if the first block does not satisfy the second determination condition;

calculating a first ratio of a total number of the specified color first block judged in the (b) judging and the (c) judging to a total number of the plurality of first blocks; and determining that the first surface is a specified color first surface when the first ratio is greater than or equal to a prescribed value, an image formed on the specified color first surface having a second ratio higher than a predetermined value, the second ratio being a ratio of an area expressed by the second specified color relative to the entire of the image formed on the specified color first surface.

13. A non-transitory computer readable storage medium storing a set of program instructions installed on and executed by a computer, the program instructions comprising:

acquiring first read data indicative of an image formed on a first surface of a single sheet of manuscript and acquiring second read data indicative of an image formed on a second surface of the single sheet of the manuscript;

dividing the first read data into a plurality of first blocks and dividing the second read data into a plurality of second blocks, each of the plurality of second blocks corresponding to respective ones of the plurality of first blocks, the first surface including a plurality of first regions each corresponding to respective ones of the plurality of first blocks, the second surface including a plurality of second regions each corresponding to respective ones of the plurality of second blocks, a first region to which each of the plurality of first blocks corresponds being opposite a second region to which respective ones of the second block corresponds;

(a) judging whether or not each second block is a specified color second block based on a first determination condition, the specified color second block corresponding to a second region that is expressed by a first specified color, a second block being judged to be the specified color second block if the second block satisfies the first determination condition, a second block being judged not to be the specified color second block if the second block does not satisfy the first determination condition;

(b) judging whether or not each first block corresponding to a second block judged not to be the specified color second block is a specified color first block based on the first determination condition, the specified color first block corresponding to a first region expressed by a second specified color, a first block being judged to be the specified color first block if the first block satisfies the first determination condition, a first block being judged not to be the specified color first block if the first block does not satisfy the first determination condition;

setting a second determination condition for each first block corresponding to a second block judged to be the specified color second block in the (a) judging, each second block being more difficult to be judged as the specific color second block based on the respective second determination condition than based on the first determination condition;

(c) judging whether or not each first block corresponding to a second block judged to be the specified color second block in the (a) judging is the specified color first block based on the respective second determination condition, a first block being judged to be the specified color first block if the first block satisfies the second determination condition, a first block being judged not to be the specified color first block if the first block does not satisfy the second determination condition;

calculating a first ratio of a total number of the specified color first block judged in the (b) judging and the (c) judging to a total number of the plurality of first blocks; and determining that the first surface is a specified color first surface when the first ratio is greater than or equal to a prescribed value, an image formed on the specified color first surface having a second ratio higher than a predetermined value, the second ratio being a ratio of an area expressed by the second specified color relative to the entire of the image formed on the specified color first surface.

* * * * *